United States Patent [19]

Nabinger

[11] Patent Number: 4,586,723

[45] Date of Patent: May 6, 1986

[54] STEERING DEVICE FOR A WHEELCHAIR

[76] Inventor: Herman G. Nabinger, 311 Kirk Ave., Syracuse, N.Y. 13205

[21] Appl. No.: 353,611

[22] Filed: Mar. 1, 1982

[51] Int. Cl.4 .................................... B62M 1/14

[52] U.S. Cl. .................... 280/242 WC; 280/92; 280/263; 280/270; 280/289 WC; 297/DIG. 4

[58] Field of Search .................. 280/89, 92, 242 WC, 280/263, 270, 272, 289 WC; 180/DIG. 3; 297/DIG. 4

[56] References Cited

U.S. PATENT DOCUMENTS

| | | | |
|---|---|---|---|
| 998,706 | 7/1911 | Marshall | 280/242 WC |
| 2,495,573 | 1/1950 | Duke | 180/DIG. 3 |
| 2,643,898 | 6/1953 | Everest et al. | 280/242 WC |
| 2,989,139 | 6/1961 | Pantek et al. | 280/242 WC |
| 3,017,199 | 1/1962 | Sechrist | 280/269 |
| 3,810,658 | 5/1974 | Weiner, Sr. | 280/242 WC |
| 4,037,676 | 7/1977 | Ruse | 180/DIG. 3 |

*Primary Examiner*—John J. Love
*Assistant Examiner*—Kenneth R. Rice
*Attorney, Agent, or Firm*—Bruns and Wall

[57] ABSTRACT

A wheelchair having a hand operated steering mechanism that can be easily mounted and/or dismounted from the chair. The mechanism involves a steering rod having a center section cojoined to an upper section and a lower section by means of a pair of universal joints. The lower section of the shaft is slidably secured to the fork of one of the chair casters and the top section is rotatably mounted in a bearing block which is, in turn, secured to the front column of one of the chair arms. A crank arm is slidably received in the top section of the steering rod to provide sufficient leverage by which the chair occupant can turn the caster. An adjustable locking mechanism is also operably associated with the shaft for holding the caster at a desired position to prevent the chair from moving in an uncontrollable manner.

7 Claims, 5 Drawing Figures

STEERING DEVICE FOR A WHEELCHAIR

BACKGROUND OF THE INVENTION

This invention relates to an improved steering mechanism for use in association with a wheelchair and, in particular, to a hand operated steering mechanism that allows the chair to be propelled and directed along a desired path of travel by a person having responsive use of only one arm.

Many people who are required to use a wheelchair suffer from a disability that has denied them the normal use of one arm and, oftentimes, both legs. Consequently, coordinating the moving and steering of the chair becomes an extremely difficult task. As shown in U.S. Pat. Nos. 3,810,658 and 3,017,199, steering devices have been devised for use in conjunction with wheelchairs wherein the patient is able to position the front casters using one leg. Generally, the leg operated steering device involves an upraised column that is adapted to embrace the upper part of the user's leg. A tie rod is secured to the lower part of the column with the ends of the rod being attached to both casters.

Although these leg operated steering devices do solve a longstanding problem in the art, they nevertheless have certain disadvantages associated therewith. In the event one of the swivel-mounted casters strikes an obstruction, such as a stone or a curb, the casters will be quickly turned away from their intended path of travel. This impact-like motion can be translated through the steering mechanism to the patient's leg. It should also be noted that the tie rod connecting the two casters is normally a continuous bar that prevents the chair from being folded. Lastly, many people needing a wheelchair simply do not have the leg response or strength required to operate the steering device.

SUMMARY OF THE INVENTION

It is therefore an object of the present invention to improve steering devices used in conjunction with a wheelchair.

A further object of the present invention is to provide a steering device for use in association with a wheelchair that enables the chair to be safely used by a person having the use of only one arm.

Another object of the present invention is to provide a hand operable steering mechanism that can be easily attached and detached to the frame of a conventional wheelchair.

Yet another object of the present invention is to provide a detachable steering mechanism that can be clamped to either the left or the right side of a wheelchair.

A still further object of the present invention is to provide a wheelchair steering mechanism that is extremely simple to install.

Still another object of the present invention is to provide for the safety of a handicapped person who is required to use a wheelchair.

These and other objects of the present invention are attained by a steering device that includes a steering rod having a center column that is connected by means of universal joints to an upper drive section and a lower drive section. The lower drive section is slidably supported in a clamp that is secured to the fork of one of the chair mounted casters. The upper drive section is rotatably supported in a bearing block which in turn is secured to the front of the chair. A crank arm is operatively connected to the upper drive section of the steering rod which, when turned, will impart a corresponding motion to the caster. A ratchet mechanism is also provided for selectively locking the steering rod in one of a number of available positions.

BRIEF DESCRIPTION OF THE DRAWINGS

For a better understanding of these and other objects of the present invention, reference is had to the following detailed description of the invention which is to be read in conjunction with the accompanying drawings, wherein.

DESCRIPTION OF THE INVENTION

Figure 1:
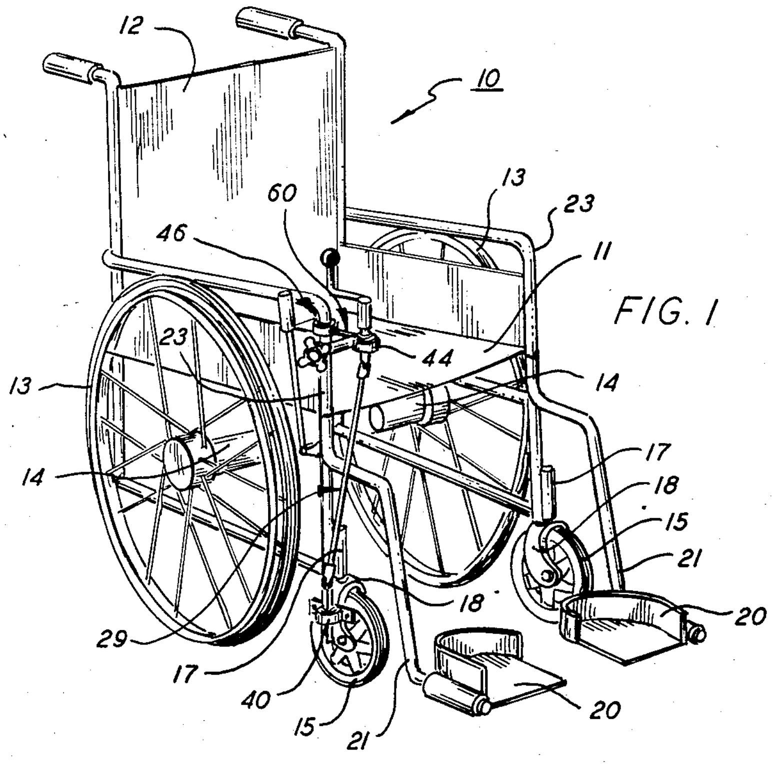
FIG. 1 is a perspective view of a conventional wheelchair utilizing a steering device embodying the teachings of the present invention.

Referring initially to FIG. 1, there is illustrated a wheelchair, generally referenced 10, that is of conventional construction. The chair includes a foldable frame of aluminum tubing that contains a bracket for supporting a flacid seat 11 and a flacid backrest 12 upon which the user is seated. A pair of relatively large drive wheels 13——used to propel the chair are rotatably supported on horizontal axles 14—14 mounted in the frame. A small diameter inner rim is secured to the main rim of each wheel which can be grasped by the chair's occupant and used to propel the wheel and thus the chair in a desired direction. Smaller steering casters 15—15 are mounted in vertically aligned sleeves 17—17 affixed to the front of the frame. Each caster is journalled for rotation in a fork 18 which, in turn, is mounted in the front part of the chair frame to allow the casters to swing freely about their vertical axles.

A pair of footrests 20—20 are suspended from the frame forward of the seat. Each rest is affixed to a support member 21 that depends outwardly and forwardly from the front riser 23 that forms a part of the arm rest. Typically, the rest platforms can be folded up into a vertical position when the chair is to be collapsed for storage.

During normal operation of the chair, the swivel-mounted front casters are allowed to swing freely within their tubular support elements. The casters generally track in a straight line when both of the larger drive wheels are turned at the same rate of speed. When the speed of the drive wheels is unequal, the casters are caused to turn toward the wheel that is turning at a lower speed and thus help in turning the chair. Manipulation of the chair by an occupant who has full use of both arms normally does not present a problem. However, if the occupant has lost the use of one arm and can turn only one wheel, the chair will be caused to turn in a circle. In some cases, the casters can be driven into a locked condition 90° to the path of travel thereby making further travel impossible or extremely dangerous.

The steering mechanism of the present invention eliminates many of these problems and allows a handicapped individual having the use of only one hand to safely propel and steer the chair when seated therein. With further reference to FIGS. 2–5, the present steering mechanism includes a steering rod 28 containing three sections that include a center column 29, an upper drive section 30 and a lower drive section 31. The sections are cojoined by means of a pair of universal joints 33—33 to permit the rod to break at two discrete points.

Figure 4:
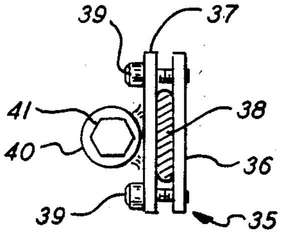
FIG. 4 is an enlarged section taken through the fork of the caster looking down upon the fork clamp used in the present invention.
Figure 5:
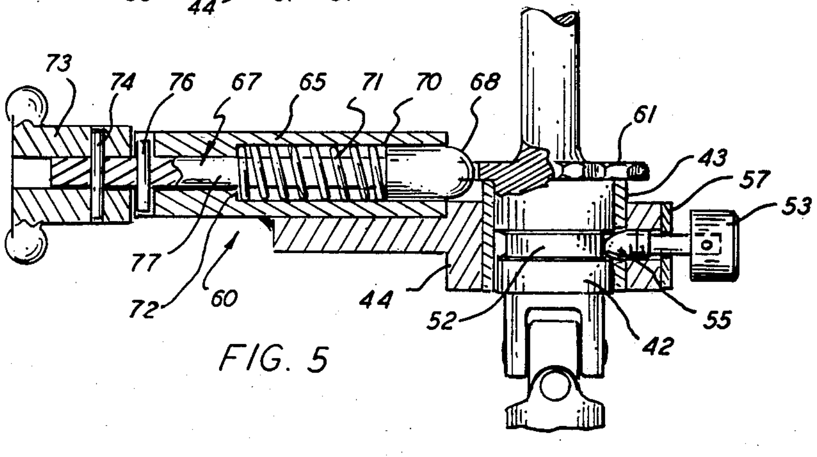
FIG. 5 is an enlarged view taken along lines 5—5 in FIG. 3 further illustrating the indexing mechanism used to selectively position the steering rod of the present invention.
Figure 2:
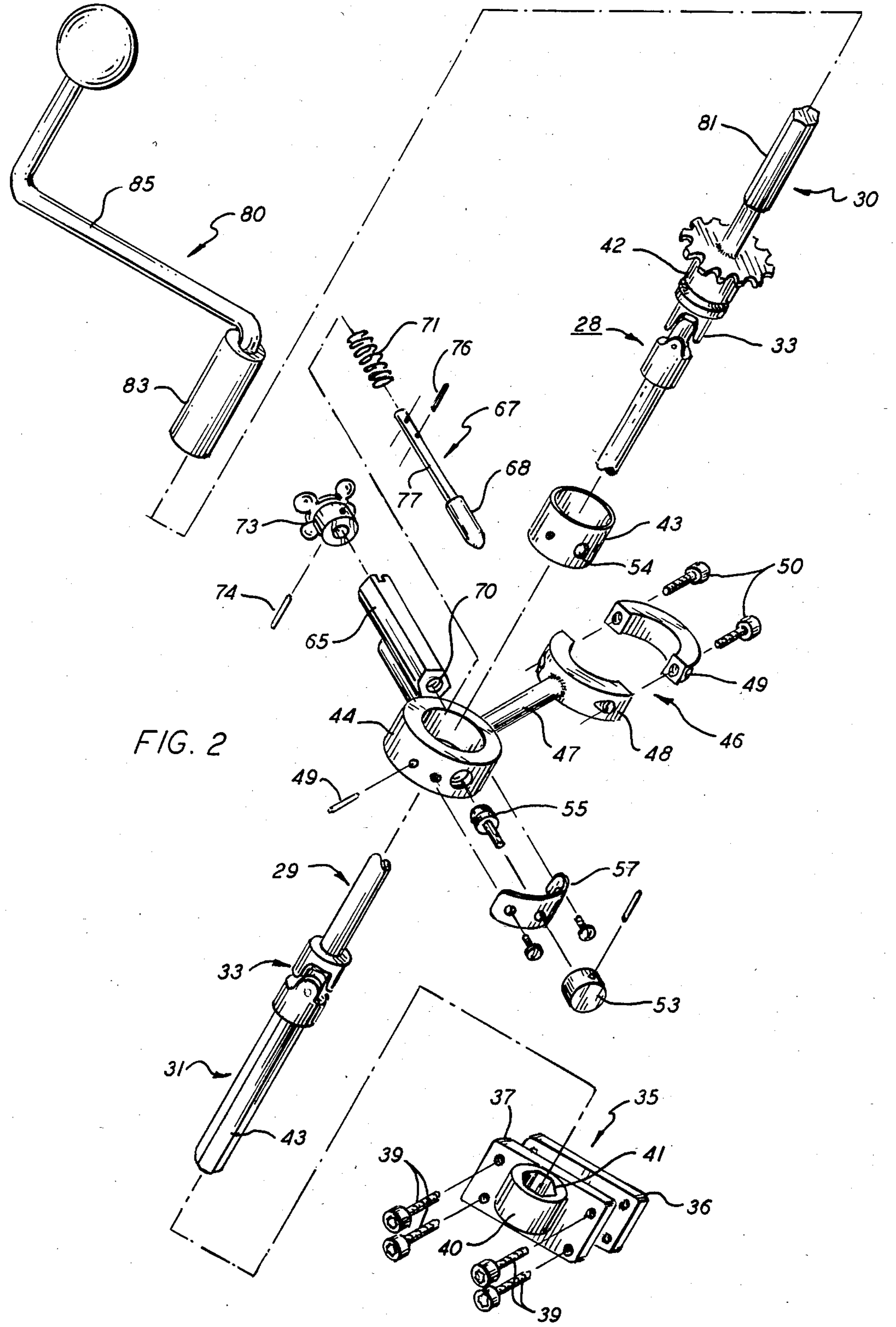
FIG. 2 is an enlarged exploded view in perspective showing the component parts of the steering device shown in FIG. 1.

A clamp 35 made up of a backing plate 36 and a cover plate 37 is clamped over the outside arm 38 of the front right caster fork using four screws 39—39 as illustrated in FIG. 4. A cylindrical guide member 40 is secured as by welding to the front face of the cover plate. The guide is provided with a hexagon-shaped opening 41 that passes vertically therethrough and in which is slidably received a complimentary hexagon-shaped shank 43 formed in the lower drive section 31 of the steering rod. The guide, in assembly, acts as a slide mechanism in which the rod is capable of moving in an axial direction while, at the same time, imparting rotational motion to the caster fork.

Figure 3:
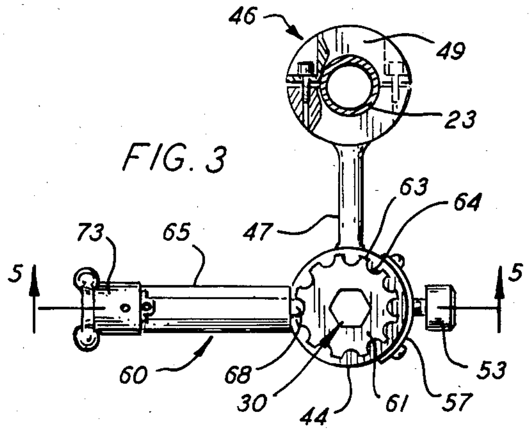
FIG. 3 is an enlarged top view of the steering device in partial section showing the crank arm removed.

The upper drive section 30 of the steering rod contains a circular bearing journal 42 that is contained, in assembly, within a cylindrical bearing 43 fabricated of any suitable bearing material. In practice, the bearing is fitted within a bearing block 44 that is attached to a split collar 46 by means of an arm 47. The bearing is held in place by a spring pin 49. As best seen in FIG. 3, the split collar 46 is mounted on front riser 23, which forms part of the right front armrest of the chair, between the body 48 of the collar and cap 49 using a pair of screws 50—50.

A circular groove 52 is machined in the journal 42 of the upper rod section. A round-headed thumb screw 53 is threaded radially into the bearing block and passes through a hole 54 provided in the bearing into the journal groove 52. When seated in the groove, the thumb screw prevents the steering rod from moving axially within the bearing block. A cover plate 57 is secured to the outer wall of the bearing block and prevents the thumb screw from falling out of the assembly.

An indexing unit 60 is also mounted in the upper part of the steering mechanism over the bearing assembly. A sprocket wheel 61 is secured to the upper drive section of the steering rod so that the wheel rests upon the top surface of the bearing in assembly. The wheel contains a plurality of evenly spaced teeth 63 that are separated by circular-shaped grooves 64. A horizontally extended tubular member 65 is securely affixed to the bearing block so that the axis of the tube is coaligned along the radial centerline of the sprocket wheel. The tubular member contains an elongated locking pin 67 therein that has a semicircular head 68 at the terminal end thereof, that is, the end facing the wheel. An expanded opening 70 is formed in the body of the tubular member and houses a biasing spring 71. The spring acts between the end face 72 of the opening and the head of the locking pin to urge the locking pin outwardly towards the sprocket wheel. A thumb wheel 73 is pinned by means of a spring dowel 74 to the end of the locking pin that extends outwardly from the rear of the tubular member. An extended stop pin 76 is press fitted into the shank 77 of the locking pin. The stop pin is arranged to extend radially from the shank in two directions. A notch 80 is formed in the rear end face of the tubular member to provide a recessed seat for receiving the extended ends of the stop pin therein.

When the stop pin is seated in the notch, the biasing spring 71 is permitted to urge the head of the locking pin outwardly into locking engagement with the sprocket wheel. By pulling the thumb wheel back against the biasing pressure of the spring, the head of the locking pin is retracted into the tubular member thereby releasing the sprocket wheel and allowing the steering rod to be rotated within the bearing block. Turning the thumb wheel slightly about its axis while it is in a retracted condition places the stop pin in contact with the rear end face of the tubular member whereupon the head of the stop pin is held out of engagement with the sprocket wheel.

A crank arm 80 is slidably supported upon the top hexagon portion 81 of the upper section of the drive shaft by means of a socket 83. The bent arm 85, as shown in FIG. 1, is arranged to extend upwardly from the front end of the right-hand arm rest so that it can be easily grasped and manipulated by the occupant. If the chair is being pushed by an attendant, the crank can be removed and stored to compress the width of the chair.

As can be seen, the apparatus of the present invention can be easily installed upon most conventional wheelchairs using ordinary tools. Similarly, it can be placed either on the right-hand or left-hand side of the chair without modifying the equipment. While this invention has been described with reference to the structure disclosed herein, it is not confined to the specific details as set forth and this application is intended to cover any modifications or changes as may come within the scope of the following claims.

I claim:

1. Apparatus for steering a wheelchair having at least one caster carried within a fork for rotatably supporting the caster within the frame of the chair, said apparatus including a steering rod having a center column that is connected to an upper drive section and a lower drive section by a pair of universal joints, a bearing block for mounting in the upper part of the frame in which the upper drive section of the shaft is rotatably supported, a clamping means secured to the caster fork for movement with said fork, said clamping means further including a slide means for slidably engaging the lower drive section of the steering rod to permit the clamping means and the lower drive section to move axially in relation to each other as the rod sections are displaced about said universal joints, and a crank means operatively connected to the upper drive section of the steering rod to turn the rod in the bearing block and thus impart a turning motion to the caster.

2. The apparatus of claim 1 that further includes locking means for selectively engaging the steering rod and hold it at a predetermined angular position within the bearing block.

3. The apparatus of claim 1 wherein said bearing block further includes a detachable collar for securing the bearing block to the frame of the chair.

4. The apparatus of claim 1 wherein said crank means includes an offset arm having a socket that compliments the cross-sectional configuration of the upper drive section of the steering rod whereby the socket can be slidably received upon the end of the upper drive section of said steering rod.

5. The apparatus of claim 2 whereby said locking means includes a sprocket wheel coaxially mounted upon the steering rod and a spring biased ball that is arranged to move radially between the teeth of the wheel for holding the steering rod at a predetermined position.

6. The apparatus of claim 5 that further includes a latch means for holding the ball out of engagement with the sprocket wheel.

7. The apparatus of claim 1 that further includes a radial groove formed in the steering rod and a spring biased pin movably mounted in said block and being seated in said groove for preventing the upper drive section of the steering rod from moving axially in assembly.

* * * * *